United States Patent
Shih et al.

(10) Patent No.: US 9,275,604 B2
(45) Date of Patent: Mar. 1, 2016

(54) CONSTANT SPEED DISPLAY METHOD OF MOBILE DEVICE

(71) Applicant: HTC Corporation, Taoyuan, Taoyuan County (TW)

(72) Inventors: I-Fen Shih, Taoyuan (TW); Sheng-Chin Chuang, Taoyuan (TW); Mao-Hung Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 264 days.

(21) Appl. No.: 13/923,031

(22) Filed: Jun. 20, 2013

(65) Prior Publication Data

US 2014/0071068 A1    Mar. 13, 2014

Related U.S. Application Data (60) Provisional application No. 61/700,103, filed on Sep. 12, 2012.

(51) Int. Cl.
| | | |
|---|---|---|
| *G06F 3/02* | (2006.01) | |
| *G09G 5/00* | (2006.01) | |
| *G06F 3/0485* | (2013.01) | |
| *G06F 3/0488* | (2013.01) | |

(52) U.S. Cl.
CPC .............. *G09G 5/006* (2013.01); *G06F 3/0485* (2013.01); *G06F 3/04883* (2013.01); *G09G 2340/02* (2013.01); *G09G 2340/0407* (2013.01); *G09G 2354/00* (2013.01)

(58) Field of Classification Search
CPC ..................................................... G09G 5/006
See application file for complete search history.

(56) References Cited

U.S. PATENT DOCUMENTS

| | | | | |
|---|---|---|---|---|
| 2009/0251423 A1* | 10/2009 | Jung | .............................. | 345/173 |
| 2011/0115822 A1* | 5/2011 | Bae | ................................ | 345/661 |
| 2012/0032988 A1* | 2/2012 | Katayama | ..................... | 345/684 |

FOREIGN PATENT DOCUMENTS

| | | |
|---|---|---|
| CN | 102156612 A | 8/2011 |
| TW | 200945176 A1 | 11/2009 |
| TW | 200945179 A1 | 11/2009 |
| TW | 201124903 A1 | 7/2011 |

OTHER PUBLICATIONS

TW Office Action dated Sep. 22, 2015, pp. 1-4.

* cited by examiner

*Primary Examiner* — Jason Olson
(74) *Attorney, Agent, or Firm* — Birch, Stewart, Kolasch & Birch, LLP (57) ABSTRACT

A constant speed display method applied in an electronic device is provided. The electronic device is in a full screen view for illustrating images in a photograph. The method has the following steps of: determining whether consecutive swiping touch actions matching specific criteria have been received by the electronic device; and displaying an aligning animation of the images in the photograph at a constant speed without being affected by a next swiping action after the consecutive swiping touch actions matching the specific criteria have been received by the electronic device.

12 Claims, 6 Drawing Sheets

CONSTANT SPEED DISPLAY METHOD OF MOBILE DEVICE

CROSS REFERENCE TO RELATED APPLICATIONS

This application claims the benefit of U.S. Provisional Application No. 61/700,103, filed at Sep. 12, 2012, the entirety of which is incorporated by reference herein.

BACKGROUND OF THE INVENTION

1. Field of the Invention

The present invention relates to electronic devices, and in particular relates to electronic devices that implement a constant speed display method capable of detecting consecutive swiping actions and displaying image aligning animation with a constant moving speed.

2. Description of the Related Art

Mobile devices, such as smart phones, tablet PCs, digital cameras, or laptops, have become more and more popular. A mobile device can be used to take pictures or receive image files from the network or other devices. However, when the amount of pictures stored in the mobile device is very large, a user may want to search for a specific picture of a selected album or view the selected album at a glance quickly in a full screen view. Specifically, the pictures of each album stored in the mobile device are generally arranged as a photograph in the full screen view. When pictures of a selected album are numerous (i.e. many pictures in the album) and it is not desired for the user to re-enter the full screen view after selecting a thumbnail in the thumbnail view, a user may have to repeat a "swiping" action many times to search for a specific picture in the full screen view. Accordingly, a current photograph view may generally change to an adjacent picture (e.g. previous picture or next picture) from the current picture by a single complete "swiping" action, which can be regarded as a "general display mode" in the full screen view. Specifically a swiping action may comprise panning and flinging actions, and the moving speed during panning and flinging is not constant. Thus, the moving speed of a photograph may correspondingly alternate during each "swiping" action in the general display mode. Accordingly, image latency or unsmooth images may be caused visually while viewing photographs with quickly repeated swiping actions (e.g. swiping for more than 3 times in one second) on conventional mobile devices.

BRIEF SUMMARY OF THE INVENTION

A detailed description is given in the following embodiments with reference to the accompanying drawings.

In an exemplary embodiment, a constant speed display method applied in an electronic device is provided. The electronic device is in a full screen view for illustrating images displayed in a form of a photograph. The method has the following steps of: determining whether consecutive swiping touch actions matching specific criteria have been received by the electronic device; and displaying an aligning animation of the images in the photograph at a constant speed after the consecutive swiping touch actions matching the specific criteria have been received by the electronic device.

In another exemplary embodiment, an electronic device is provided. The electronic device comprises a touch screen and a processor. The processor is configured to determine whether consecutive swiping touch actions matching specific criteria have been received by the touch screen of the electronic device, and display an aligning animation of the images in the photograph at a constant speed after the consecutive swiping touch actions matching the specific criteria have been received by the touch screen of the electronic device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
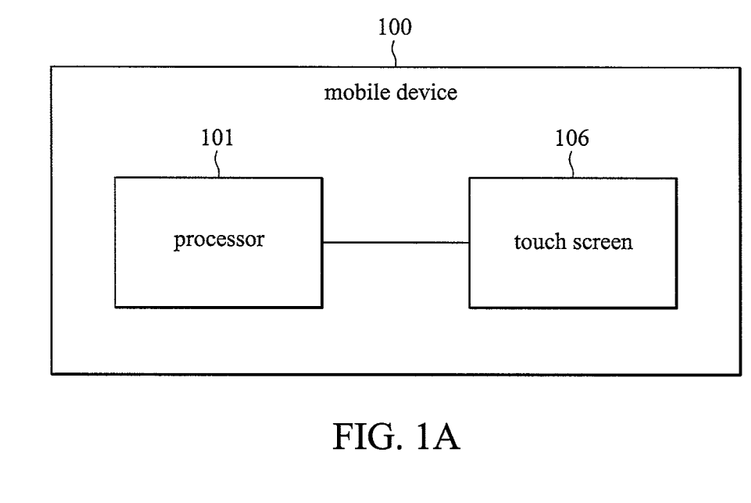
FIG. 1A is a block diagram of the mobile device 100 according to an embodiment of the invention.
Figure 1B:
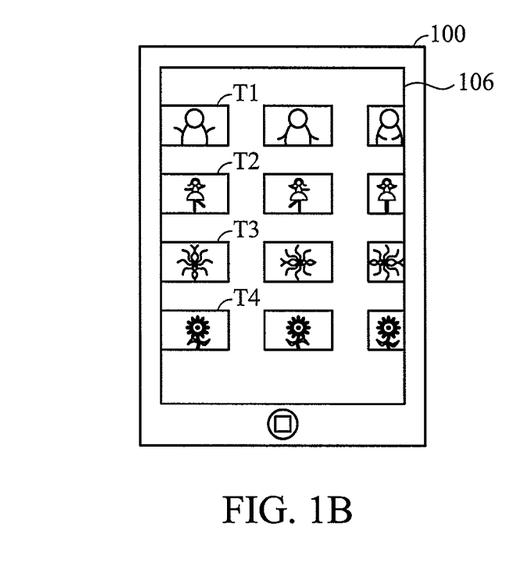
FIGS. 1B and 1C are conceptual diagrams for viewing pictures on a mobile device according to an embodiment of the invention.
Figure 1C:
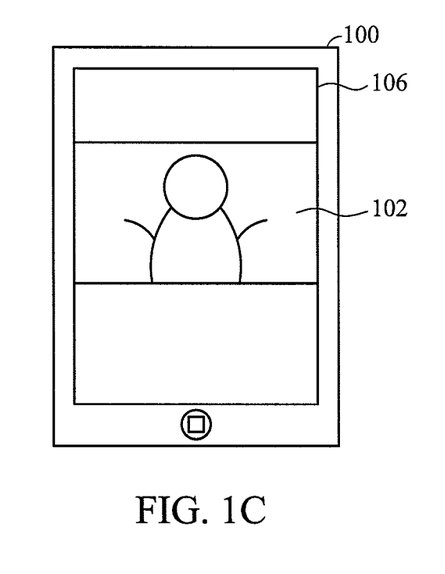

FIG. 1A is a block diagram of the mobile device 100 according to an embodiment of the invention. FIGS. 1B and 1C are conceptual diagrams for viewing pictures on a mobile device according to an embodiment of the invention. As illustrated in FIG. 1A, the mobile device 100 may comprise a processor 101 and a touch screen 106, wherein the touch screen 106 is configured to receive a plurality of touch actions, and the processor 101 may perform corresponding processing based on the received touch actions. The mobile device 100 may usually enter a thumbnail view after selecting one of the albums by the user, and then the mobile device 100 may further enter the full screen view after selecting a thumbnail in the thumbnail view. As illustrated in FIG. 1B, the pictures stored in a mobile device 100 can be classified into a plurality of albums, wherein each album is represented by an individual thumbnail picture. A user may select a specific album by tapping a finger on the touch screen 106 of the mobile device 100. The full screen view of one picture in the selected album is illustrated in FIG. 1C. The pictures of the selected album are generally displayed in a form of a photograph. That is, the pictures of the selected album are connected sequentially in the full screen view mode, and thus the user may "swipe" his/her fingers on the touch screen 106 to alternately display the pictures (e.g. from picture P2 to picture P1 or P3) of a photograph. It should be noted that the full screen view can be adaptively rotated while the mobile device 100 is placed horizontally or vertically.

Specifically, the action "swiping" can be further divided into consecutive detailed actions "panning" and "flinging".

The action "panning" may indicate that the user has tapped a finger on the touch screen 106 and slides the finger for a certain distance (e.g. more than 10 pixels) in the same direction. The action "flinging" may indicate that the user has released a finger. During the "panning" action, the user may drag the current view 102 of a slide show left or right by sliding a finger left or right, respectively. It is noted that, the moving distance of a photograph of the selected album corresponds to the sliding distance and direction of the finger.

After releasing the finger (i.e. action "flinging), the current view 102 of the mobile device 100 may be moved (i.e. "image sliding" action) to a previous picture or next picture in response to the direction of the panning action (e.g. sliding left or right). It is also noted that, the "image sliding" action can be regarded as an "aligning animation", and it is usually implemented by moving the photograph at a high initial moving speed with decreasing acceleration, so that the user perceives that a subsequent image (e.g. previous image or next image) is displayed smoothly.

In addition, the current view of a photograph may generally change to an adjacent picture (e.g. previous picture or next picture) from the current picture by a single complete "swiping" action, which can be regarded as a "general display mode" in the full screen view. However, the user may want to search for a specific picture of the selected album or view the selected album at a glance quickly in the full screen view. When the photograph of the selected album comprise multiple pictures, the user may have to repeat the "swiping" action many times to search for the specific picture intuitively. As described above, the moving speed of a photograph may correspondingly alternate during each "swiping" action. Accordingly, image latency or unsmooth images may be caused visually, while viewing the photograph with quickly repeated swiping actions (e.g. swiping for more than 3 times in one second) on conventional mobile devices.

In an embodiment, a constant speed display method for preventing the above-mentioned image latency issue is further introduced in the invention. Specifically, in addition to a single "swiping" action for viewing a photograph, the invention further presents a constant speed display mode for displaying of the photograph when the user is repeating the swiping action rapidly on the touch screen 106 in the full screen view. In other words, there is the general display mode and the constant speed display mode in the full screen view and the mobile device 100 may determine whether the user wants to view the photograph quickly in the general display mode. Accordingly, the general display mode can be regarded as the initial (default) display mode for viewing the photograph, and the constant speed display mode can be regarded as an "enhanced display mode" by aligning animations for improving the visual experience while quickly viewing pictures of a photograph.

Generally, a user is capable of repeating the swiping action for 3~5 times in a second. Thus, a predetermined time period (e.g. 0.6 sec) can be set for determining whether the time interval between consecutive swiping actions is short enough for the mobile device 100 to enter the constant speed display mode. When the time interval between consecutive swiping actions is shorter than the predetermined time period, it may indicate that the user wants to view the photograph quickly under the general display mode, and thus the mobile device 100 may enter the constant speed display mode, so that the aligning animation in which the photograph can be displayed at is at a constant speed with repeated swiping actions. In short, several criteria can be used to determine whether to enter the constant speed display mode. These criteria can be (a) the interval between two (consecutive) swiping actions being smaller than a predetermined time period (e.g. 0.6 sec); (b) the two (consecutive)swiping actions both having moving distances which have exceeded a threshold (e.g. 10 pixels); and (c) the two (consecutive) swiping actions being in the same direction.

If the mobile device 100 enters the constant speed display mode and a user swipes a finger quickly enough and continuously in the same direction on the touch screen, the constant speed display mode will be maintained. Specifically, the aligning animation of the subsequent image of a photograph can be completed within a very short time period (e.g. 0.2~0.3 sec) under the constant speed display mode after each flinging action is completed. If a next swiping action in the same direction is inputted quickly enough and continuously (i.e. details will be described later) before the aligning animation of the subsequent image ends, the mobile device 100 may determine that the constant speed display mode should be maintained. Otherwise, the mobile device 100 may exit to the general display mode from the constant speed display mode. It should be noted that a subsequent swiping touch action does not affect the displaying of the aligning animation before the displaying of the aligning animation of the current image is finished.

In other words, once the mobile device 100 enters the constant speed display mode, only a "qualified" input touch event may keep the mobile device 100 at the constant speed mode. The "qualified" input touch event may indicate that the next swiping action in the same direction with the most recent consecutive swiping actions was inputted before the aligning animation ended or within the predetermined time period (e.g. 0.6 sec). Meanwhile, there may be several conditions which may cause the mobile device 100 to exit the constant speed display mode. For example, the conditions can be that (1) the panning direction of the input touch event is opposite to the direction of the aligning animation; (2) the user may press (i.e. a pressing touch action, or regarded as a press-and-hold touch action with or without movement) on the touch screen 106 for more than a specific time period (e.g. >0.5 sec); or (3) no input touch event is received before the aligning animation ends or within the predetermined time period.

In another embodiment, a subsequent swiping touch action may affect the displaying of the aligning animation of the current image. In other words, the displaying of the aligning animation of the current image may be stopped under some conditions. For example, when it is detected that the panning direction of the input touch event is opposite to the direction of the aligning animation, the aligning animation of the current image is stopped immediately. Thus, the user can see the desired image by stopping the aligning animation with an input touch event having a panning direction opposite to the direction of the aligning animation. Then, the user may further change the direction of the aligning animation by another consecutive qualified input touch event. In addition, the aligning animation of the current image can also be stopped immediately by a pressing touch action on the touch screen for more than a specific time period (e.g. >0.5 sec). Specifically, when any one of the aforementioned conditions (1) and (2) occurs, the aligning animation of the current image is stopped immediately. Meanwhile, the mobile device 100 may exit the constant speed display mode and enter the general display mode.

Figure 2A:
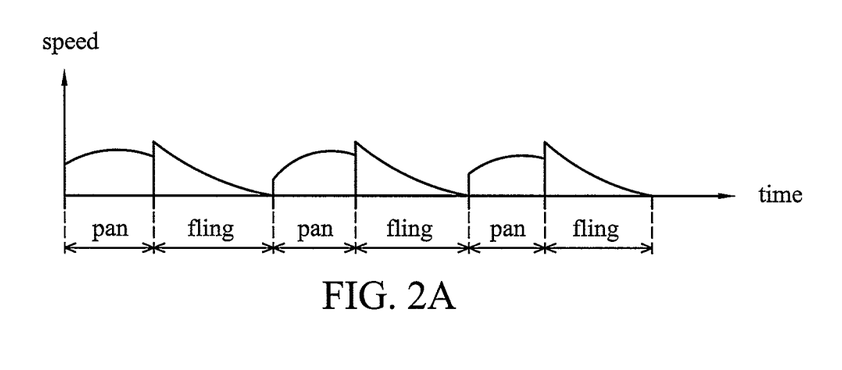
FIG. 2A is a conceptual diagram of the moving speed of a photograph under the general display mode according to an embodiment of the invention.
Figure 2B:
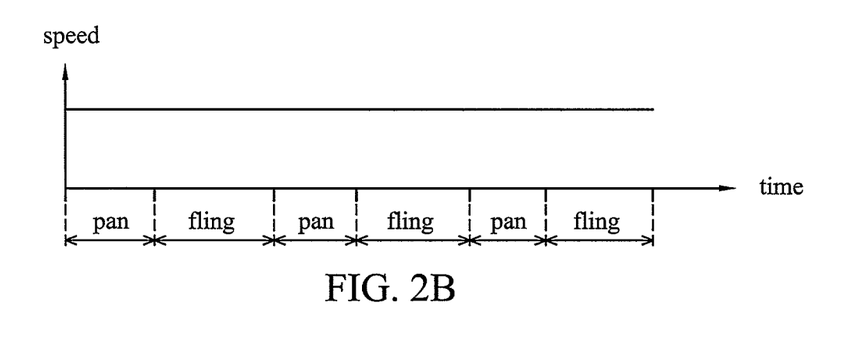
FIG. 2B is a conceptual diagram of the moving speed of a photograph under the constant speed display mode according to an embodiment of the invention.

FIG. 2A is a conceptual diagram of the moving speed of a photograph under the general display mode according to an embodiment of the invention. FIG. 2B is a conceptual diagram of the moving speed of a photograph under the constant speed display mode according to an embodiment of the invention. As illustrated in FIG. 2A, the moving speed of a photograph during the "panning" action and the "flinging" action may vary in the general display mode, as described in the aforementioned embodiments. When the mobile device 100 detects that the interval between consecutive swiping actions is shorter than the predetermined time period (e.g. 0.6 sec), the mobile device 100 may enter the constant speed display mode from the general display mode. As illustrated in FIG. 2B, if the user swipes a finger in the same direction quickly enough and continuously, a constant speed display mode can be maintained and thus the images of a photograph can be displayed with a constant image moving speed.

In another embodiment, pictures stored in the mobile device 100 are generally in the form of compressed image files (e.g. JPEG files), and the size of some pictures may be large (e.g. more than 8M pixels). However, for implementation considerations and limited resources, the processing unit or image decoder of the mobile device 100 may be not able to decode the pictures in high quality with such a fast constant image moving speed at the constant speed display mode (i.e. decoding a large size high quality picture in 0.2 sec). For example, it may take more than 0.5 sec to decode a high quality JPEG file with a larger size (e.g. 8M pixels) by the mobile device 100, and it may take only 0.2~0.3 sec to display the aligning animation of the subsequent image completely at the constant speed display mode. In other words, if the constant speed display mode is kept on, an insufficient amount of time would be allotted for the mobile device 100 to decode the compressed image file for each subsequent image with high quality, which may cause artifacts or a black screen on the displayed images. In order to solve this issue, the processing unit or image decoder (either via software or hardware) of the mobile device 100 may decode the compressed image file in low quality (e.g. using a large quantization step size for decoding or using a quarter resolution in horizontal/vertical directions) at the constant speed display mode. The downscaled decompressed images can be further enlarged by a scalar deployed in the mobile device 100 to fit the size of the touch screen 106. Accordingly, the invention may ensure that the compressed image file of the current image can be decoded in time to improve the visual smoothness of a photograph at the constant speed display mode.

Figure 3:
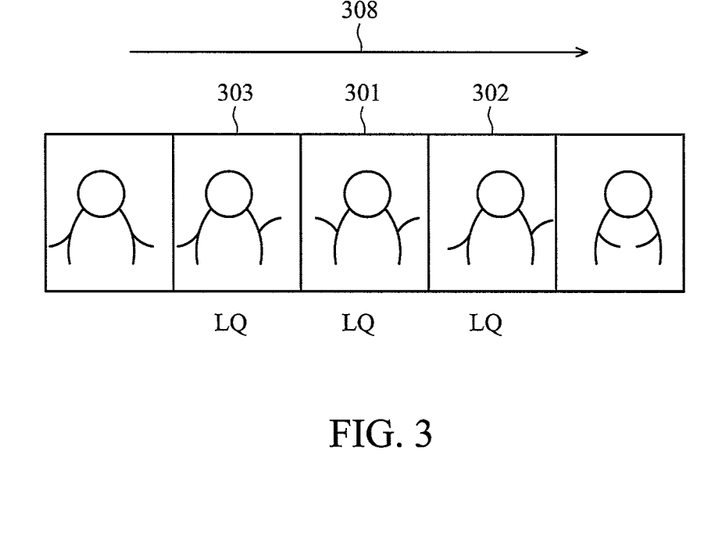
FIG. 3 is a conceptual diagram of an order for decoding images displayed by the mobile device 100 according to an embodiment of the invention.

FIG. 3 is a conceptual diagram of an order for decoding images displayed by the mobile device 100 according to an embodiment of the invention. In the aforementioned embodiment, the mobile device 100 may decode the compressed image file of the current image in low quality prior to decoding the compressed image files of the previous image and a subsequent image in low quality. Specifically, the image decoder of the mobile device 100 may decode the current image 301 in low quality first, and then decode a subsequent image 302 in low quality along the panning direction (i.e. arrow 308). After decoding the current image 301 and the subsequent image 302 in low quality, the image decoder may decode the previous image 303 in low quality, as illustrated in FIG. 3. It is noted that, the image decoder may decode the images in high quality at the same time. For example, while decoding the current image 301 in low quality, the image decoder may simultaneously decode the current image 301 in high quality in the background. Further, while decoding the subsequent image 302 and previous image 303 in low quality, the image decoder may simultaneously decode the subsequent image 302 and previous image 303 in high quality, respectively. Once the constant speed display mode stops, the current image can be displayed in a full screen view with low quality first, and then the current image 301 in a full screen view with high quality may be decoded and then faded in onto the touch screen 106 to replace the current image 301 of low quality. Therefore, the invention may maintain good performance while displaying the images at a constant speed display mode in a full screen view without sacrificing much high quality.

Figure 4:
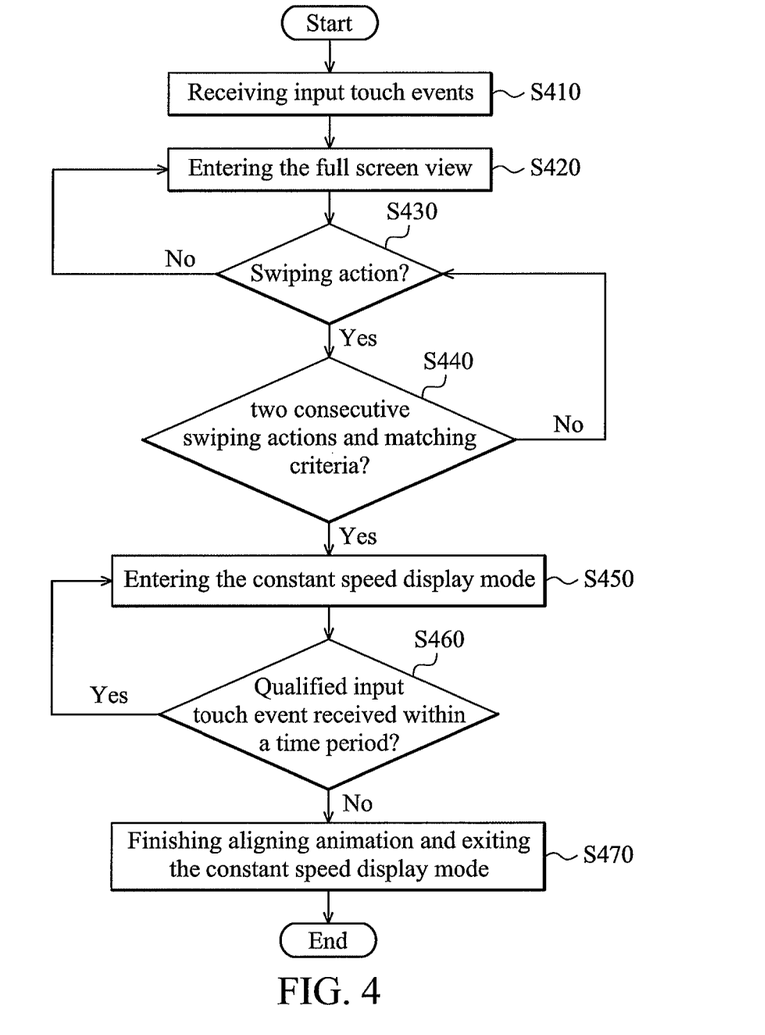
FIG. 4 illustrates a flow chart of the display method according to an embodiment of the invention.

FIG. 4 illustrates a flow chart of the display method according to an embodiment of the invention. In step S410, the mobile device 100 may receive input touch event. In step S420, the input touch event may direct the mobile device 100 (e.g. pressing a specific thumbnail image on the album view) to enter the general display mode in the full screen view. In step S430, the mobile device 100 may determine whether the input touch event is a swiping action in the full screen view. If so, step S440 is performed. Otherwise, step S420 is performed. In step S440, the mobile device 100 may further determine whether the most recent consecutive input touch events (e.g. last and current input touch event) were "swiping" actions, and whether the two swiping actions match some criteria for entering the constant speed display mode. For example, the criteria, as described above, can be (a) the interval between the two (consecutive) swiping actions being smaller than a predetermined time period (e.g. 0.6 sec); (b) the two (consecutive) swiping actions both having moving distances which exceed a threshold (e.g. 10 pixels); and (c) the two (consecutive) swiping actions being in the same direction. If so, step S450 is performed. Otherwise, step S430 is performed. In step S450, the mobile device 100 enters the constant speed display mode. The mobile device 100 may align animation of the images of a photograph with a constant speed. However, in order to keep the constant speed display mode, the mobile device 100 may have to determine whether a "qualified" input touch event has been received before the aligning animation ends (step S460), wherein the qualified input touch event may indicate that a swiping action in the same direction with the most recent swiping actions has been inputted before the aligning animation ended. In other words, the mobile device 100 may determine whether the consecutive swiping actions are immediately followed by a qualified swiping action. If so, step S450 is performed, so that the mobile device 100 can be kept at the constant speed display mode, and the aligning animation is still displayed in the same constant speed. Otherwise, the mobile device 100 may finish the current aligning animation and exit to the general display mode from the constant speed display mode (step S470).

Figure 5:
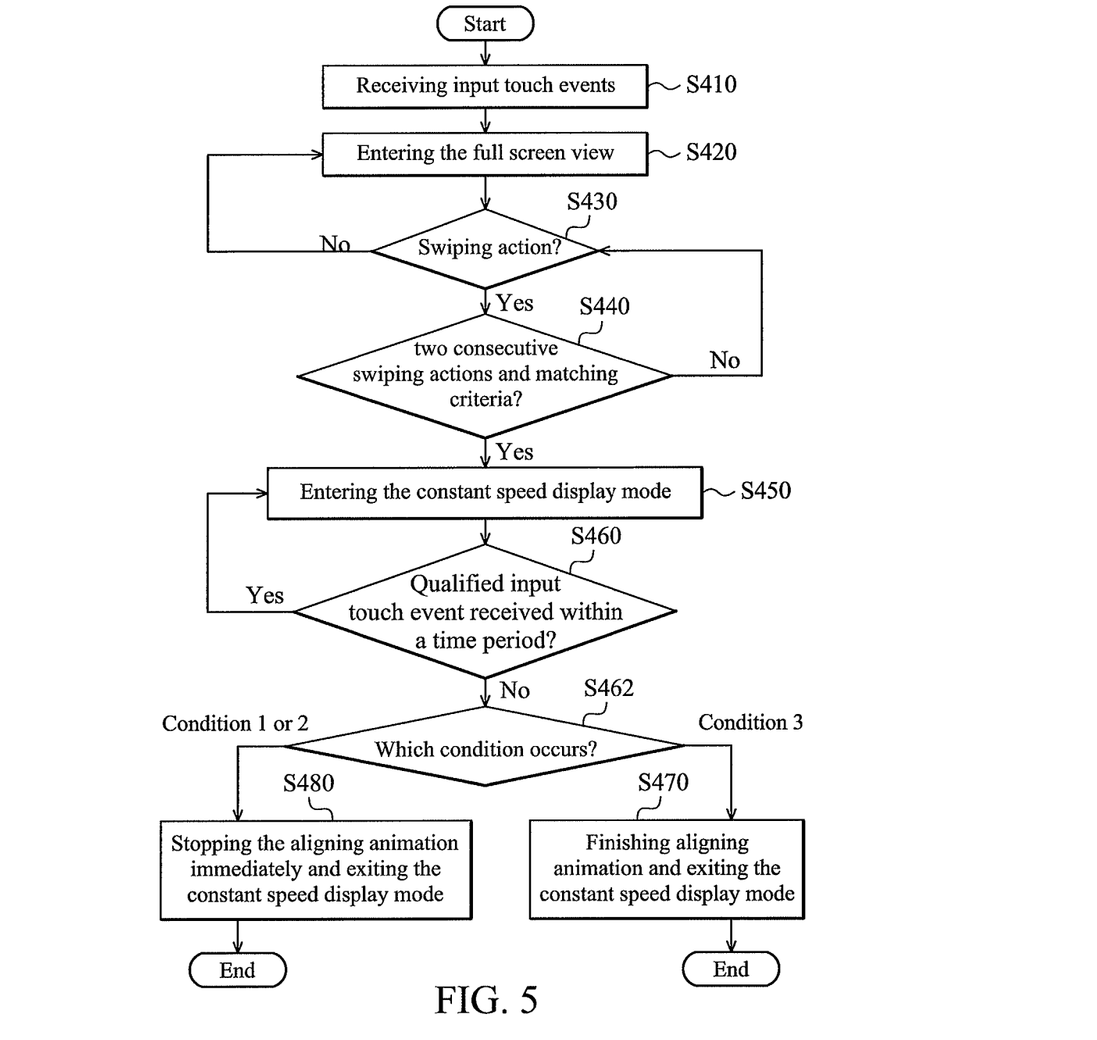
FIG. 5 is a flow chart of the display method according to another embodiment of the invention.

FIG. 5 is a flow chart of the display method according to another embodiment of the invention. Referring to both FIG. 4 and FIG. 5, the steps S410~S460 in FIG. 4 are the same as those in FIG. 5. The differences between FIG. 4 and FIG. 5 are that the aligning animation of the current image is stopped immediately when any one of the aforementioned conditions (1) and (2) occurs. When the aforementioned condition (3) occurs, the mobile device 100 may finish the aligning animation of the current image and exit the constant speed display mode (step S470). Specifically, referring to FIG. 5, in step S462, it is determined which condition occurs when no qualified input touch event received within a time period (No in step S460). If the aforementioned condition (1) or (2) occurs, step S480 is performed. Otherwise, it is indicated that condition (3) occurs, and step S470 is performed. As described, the conditions can be that (1) the panning direction of the input touch event is opposite to the direction of the aligning animation; (2) the user may press (i.e. a pressing touch action, or regarded as a press-and-hold touch action with or without movement) on the touch screen 106 for more than a specific time period (e.g. >0.5 sec); or (3) no input touch event is received before the aligning animation ends or within the predetermined time period.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A constant speed display method applied in an electronic device, the electronic device being in a full screen view for illustrating images displayed in a form of a photograph, the method comprising
   determining whether consecutive swiping touch actions matching specific criteria have been received by the electronic device; and
   displaying an aligning animation of the images at a constant speed after the consecutive swiping touch actions matching the specific criteria have been received by the electronic device,
   wherein the specific criteria indicates that the consecutive swiping touch actions are in the same direction, and an interval between the consecutive swiping touch actions is smaller than a predetermined time period.

2. The method as claimed in claim 1, wherein the specific criteria further indicates that the consecutive swiping touch actions both have moving distances which exceed a threshold value.

3. The method as claimed in claim 1, further comprising:
   determining whether the consecutive swiping touch actions are immediately followed by a next swiping touch action in the same direction within a predetermined time period before the aligning animation ends; and
   when it is determined that the consecutive swiping touch actions are immediately followed by the next swiping touch action in the same direction within the predetermined time period before the aligning animation ends, maintaining the displaying of the aligning animation of the images at the constant speed,
   wherein the displaying of the aligning animation is not affected by the next swiping touch action before the displaying of the aligning animation of the current image is finished.

4. The method as claimed in claim 3, further comprising:
   when the next swiping touch action is in an opposite direction of the aligning animation, finishing the displaying of the aligning animation of a current image at the constant speed.

5. The method as claimed in claim 3, further comprising:
   when the consecutive swiping touch actions are immediately followed by a next pressing touch action on a touch screen of the electronic device for more than a specific time period, finishing the displaying of the aligning animation of a current image at the constant speed.

6. The method as claimed in claim 3, further comprising:
   when the next touch action is not received with the predetermined time period, finishing the displaying of the aligning animation of a current image at the constant speed.

7. An electronic device, comprising:
   a touch screen; and
   a processor, configured to determine whether consecutive swiping touch actions matching specific criteria have been received by the touch screen of the electronic device, and display an aligning animation of the images in a form of a photograph at a constant speed after the consecutive swiping touch actions matching the specific criteria have been received by the touch screen of the electronic device,
   wherein the specific criteria indicates that the consecutive swiping touch actions are in the same direction, and an interval between the consecutive swiping touch actions is smaller than a predetermined time period.

8. The electronic device as claimed in claim 7, wherein the specific criteria further indicates that the consecutive swiping touch actions both have moving distances which exceed a threshold value.

9. The electronic device as claimed in claim 7, wherein the processor further determines whether the consecutive swiping touch actions are immediately followed by a next swiping touch action in the same direction within a predetermined time period before the aligning animation ends;
   when it is determined that the consecutive swiping touch actions are immediately followed by the next swiping touch action in the same direction within the predetermined time period before the aligning animation ends, the processor maintains the displaying of the aligning animation of the images at the constant speed,
   wherein the next swiping touch action does not affect the displaying of the aligning animation before the displaying of the aligning animation of the current image is finished.

10. The electronic device as claimed in claim 9, wherein when the next swiping touch action is in an opposite direction of the aligning animation, the processor further finishes the displaying of the aligning animation of a current image at the constant speed.

11. The electronic device as claimed in claim 9, wherein when the consecutive swiping touch actions are immediately followed by a next pressing action on a touch screen of the electronic device for more than a specific time period, the processor further finishes the displaying of the aligning animation of a current image at the constant speed.

12. The electronic device as claimed in claim 9, wherein when the next touch action is not received with the predetermined time period, the processor further finishes the displaying of the aligning animation of a current image at the constant speed.

* * * * *